US008091111B2

(12) United States Patent  
Logan et al.

(10) Patent No.: US 8,091,111 B2
(45) Date of Patent: Jan. 3, 2012

(54) METHODS AND APPARATUS FOR RECORDING AND REPLAYING SPORTS BROADCASTS

(75) Inventors: James D. Logan, Candia, NH (US); Scott A. Durgin, North Andover, MA (US); Dana Burd, Charlestown, MA (US)

(73) Assignee: Digitalsmiths, Inc., Durham, NC (US)

( * ) Notice: Subject to any disclaimer, the term of this patent is extended or adjusted under 35 U.S.C. 154(b) by 871 days.

(21) Appl. No.: 11/894,685

(22) Filed: Aug. 20, 2007

(65) Prior Publication Data

US 2008/0060001 A1     Mar. 6, 2008

Related U.S. Application Data

(63) Continuation of application No. 10/767,930, filed on Jan. 29, 2004, now abandoned, and a continuation-in-part of application No. 10/060,001, filed on Jan. 29, 2002, and a continuation-in-part of application No. 10/165,587, filed on Jun. 8, 2002, now abandoned.

(60) Provisional application No. 60/443,379, filed on Jan. 29, 2003, provisional application No. 60/304,570, filed on Jul. 11, 2001, provisional application No. 60/336,602, filed on Dec. 28, 2001, provisional application No. 60/346,418, filed on Dec. 29, 2001, provisional application No. 60/297,204, filed on Jun. 8, 2001, provisional application No. 60/352,788, filed on Nov. 28, 2001.

(51) Int. Cl.
*H04N 7/14* (2006.01)

(52) U.S. Cl. .......................... 725/110; 725/101; 709/221

(58) Field of Classification Search ............ 725/87–120; 709/217–232

See application file for complete search history.

(56) References Cited

U.S. PATENT DOCUMENTS

| 4,528,589 | A | 7/1985 | Block et al. |
| 5,057,932 | A | 10/1991 | Lang |
| 5,109,482 | A | 4/1992 | Bohrman |
| 5,119,507 | A | 6/1992 | Mankovitz |
| 5,353,121 | A | 10/1994 | Young et al. |
| 5,436,653 | A | 7/1995 | Ellis et al. |
| 5,485,219 | A | 1/1996 | Woo et al. |
| 5,534,911 | A | 7/1996 | Levitan |
| 5,610,653 | A | 3/1997 | Abecassis |
| 5,634,849 | A | 6/1997 | Abecassis |
| 5,675,695 | A | 10/1997 | Hirayama et al. |
| 5,694,163 | A | 12/1997 | Harrison |

(Continued)

FOREIGN PATENT DOCUMENTS

EP     0424648     5/1991

(Continued)

OTHER PUBLICATIONS

Office Action dated Aug. 4, 2009 for U.S. Appl. No. 10/006,001.

(Continued)

*Primary Examiner* — Annan Shang

(57) ABSTRACT

A system for replaying a broadcast sports event using a video on demand or personal video recording system. Metadata is created that subdivides the original broadcast into segments, and associates descriptive information with each segment. Playlists that specify an ordered subsequence of the sequence may be selected and used to present a variety of expanded or condensed versions of the sporting event to a viewer. Navigation controls including segment lists, specially formatted screen displays, and special functions under the control of a user-operated remote control, facilitate the interactive selection and control of the presentation.

18 Claims, 2 Drawing Sheets

U.S. PATENT DOCUMENTS

| | | | |
|---|---|---|---|
| 5,710,815 | A | 1/1998 | Ming et al. |
| 5,732,216 | A | 3/1998 | Logan et al. |
| 5,732,324 | A | 3/1998 | Rieger, III |
| 5,736,977 | A | 4/1998 | Hughes |
| 5,754,938 | A | 5/1998 | Herz et al. |
| 5,781,228 | A | 7/1998 | Sposato |
| 5,818,439 | A | 10/1998 | Nagasaka et al. |
| 5,838,917 | A | 11/1998 | Paolini |
| 5,844,620 | A | 12/1998 | Coleman et al. |
| 5,872,588 | A | 2/1999 | Aras et al. |
| 5,884,056 | A | 3/1999 | Steele |
| 5,892,536 | A | 4/1999 | Logan et al. |
| 5,937,331 | A | 8/1999 | Kalluri et al. |
| 5,949,876 | A | 9/1999 | Ginter et al. |
| 5,970,504 | A | 10/1999 | Abe et al. |
| 5,974,218 | A | 10/1999 | Nagasaka et al. |
| 5,986,692 | A | 11/1999 | Logan et al. |
| 6,005,603 | A | 12/1999 | Flavin |
| 6,026,376 | A | 2/2000 | Kenney |
| 6,081,830 | A | 6/2000 | Schindler |
| 6,088,455 | A | 7/2000 | Logan et al. |
| 6,118,450 | A | 9/2000 | Proehl et al. |
| 6,144,375 | A * | 11/2000 | Jain et al. ............ 715/251 |
| 6,154,771 | A | 11/2000 | Rangan et al. |
| 6,226,030 | B1 | 5/2001 | Harvey et al. |
| 6,233,389 | B1 | 5/2001 | Barton et al. |
| 6,240,555 | B1 * | 5/2001 | Shoff et al. ............ 725/110 |
| 6,243,725 | B1 | 6/2001 | Hempleman et al. |
| 6,248,946 | B1 | 6/2001 | Dwek |
| 6,262,724 | B1 | 7/2001 | Crow et al. |
| 6,289,165 | B1 | 9/2001 | Abecassis |
| 6,357,042 | B2 | 3/2002 | Srinivasan et al. |
| 6,366,296 | B1 | 4/2002 | Boreczky et al. |
| 6,388,958 | B1 | 5/2002 | Yankowski |
| 6,389,467 | B1 | 5/2002 | Eyal |
| 6,439,572 | B1 * | 8/2002 | Bowen ............ 273/239 |
| 6,499,027 | B1 | 12/2002 | Weinberger |
| 6,519,693 | B1 | 2/2003 | Debey et al. |
| 6,526,411 | B1 | 2/2003 | Ward |
| 6,560,798 | B2 | 5/2003 | Welling et al. |
| 6,563,515 | B1 | 5/2003 | Reynolds et al. |
| 6,567,980 | B1 | 5/2003 | Jain et al. |
| 6,581,207 | B1 | 6/2003 | Sumita et al. |
| 6,584,463 | B2 | 6/2003 | Morita et al. |
| 6,628,303 | B1 | 9/2003 | Foreman et al. |
| 6,637,029 | B1 | 10/2003 | Maissel et al. |
| 6,686,440 | B2 | 2/2004 | Swift |
| 6,738,978 | B1 | 5/2004 | Hendricks et al. |
| 6,754,904 | B1 | 6/2004 | Cooper et al. |
| 6,763,345 | B1 | 7/2004 | Hempleman et al. |
| 6,813,775 | B1 | 11/2004 | Finseth et al. |
| 6,839,880 | B1 | 1/2005 | Morse et al. |
| 6,990,676 | B1 | 1/2006 | Proehl et al. |
| 7,055,166 | B1 | 5/2006 | Logan et al. |
| 7,284,032 | B2 | 10/2007 | Weber |
| 7,313,808 | B1 * | 12/2007 | Gupta et al. ............ 725/89 |
| 7,320,137 | B1 | 1/2008 | Novak et al. |
| 7,548,565 | B2 | 6/2009 | Sull et al. |
| 7,631,327 | B2 * | 12/2009 | Dempski et al. ............ 725/34 |
| 2001/0037378 | A1 | 11/2001 | Hirayama |
| 2001/0049826 | A1 | 12/2001 | Wilf |
| 2002/0026496 | A1 | 2/2002 | Boyer et al. |
| 2002/0034980 | A1 | 3/2002 | Lemmons et al. |
| 2002/0065678 | A1 | 5/2002 | Peliotis et al. |
| 2002/0106191 | A1 | 8/2002 | Betz et al. |
| 2002/0120925 | A1 | 8/2002 | Logan |
| 2002/0157099 | A1 | 10/2002 | Schrader et al. |
| 2002/0157101 | A1 * | 10/2002 | Schrader et al. ............ 725/64 |
| 2002/0166123 | A1 | 11/2002 | Schrader et al. |
| 2003/0054885 | A1 | 3/2003 | Pinto et al. |
| 2003/0093790 | A1 | 5/2003 | Logan et al. |
| 2003/0095790 | A1 | 5/2003 | Joshi |
| 2003/0100965 | A1 | 5/2003 | Sirick et al. |
| 2003/0110507 | A1 | 6/2003 | DiMitrova et al. |
| 2003/0182254 | A1 | 9/2003 | Plastina et al. |
| 2003/0208473 | A1 | 11/2003 | Lennon |
| 2004/0017389 | A1 | 1/2004 | Pan et al. |
| 2004/0078808 | A1 | 4/2004 | Herledan |
| 2004/0111465 | A1 | 6/2004 | Chuang et al. |
| 2004/0117831 | A1 | 6/2004 | Ellis et al. |
| 2004/0138948 | A1 | 7/2004 | Loomis |
| 2004/0249726 | A1 | 12/2004 | Linehan |
| 2005/0076362 | A1 | 4/2005 | Dukes et al. |
| 2005/0144641 | A1 | 6/2005 | Lewis |
| 2005/0149964 | A1 | 7/2005 | Thomas et al. |
| 2005/0183119 | A1 | 8/2005 | Hofrichter et al. |
| 2005/0239549 | A1 | 10/2005 | Salvatore et al. |
| 2005/0262542 | A1 | 11/2005 | DeWeese et al. |
| 2005/0283810 | A1 | 12/2005 | Ellis et al. |
| 2006/0031882 | A1 | 2/2006 | Swix et al. |
| 2006/0129458 | A1 | 6/2006 | Maggio |
| 2006/0183547 | A1 | 8/2006 | McMonigle |
| 2006/0184989 | A1 | 8/2006 | Slothouber |
| 2006/0190966 | A1 | 8/2006 | McKissick et al. |
| 2008/0154628 | A1 | 6/2008 | Ogawa et al. |

FOREIGN PATENT DOCUMENTS

| | | |
|---|---|---|
| EP | 0898278 | 2/1999 |
| EP | 1079623 | 2/2001 |
| GB | GP 2304489 | 3/1997 |
| WO | WO-9627840 | 9/1996 |
| WO | WO-9637965 | 11/1996 |
| WO | WO-9831113 | 7/1998 |
| WO | WO-0115449 | 3/2001 |
| WO | WO-2004/043029 | 5/2004 |

OTHER PUBLICATIONS

Non Final Office Action dated Apr. 4, 2008, U.S. Appl. No. 10/767,926.

Non Final Office Action dated Feb. 7, 2008, U.S. Appl. No. 10/767,946.

International Preliminary Report on Patentability, Serial No. PCT/US2006/035143.

* cited by examiner

METHODS AND APPARATUS FOR RECORDING AND REPLAYING SPORTS BROADCASTS

CROSS REFERENCE TO RELATED APPLICATIONS

This application is a continuation of U.S. application Ser. No. 10/767,930 filed Jan. 29, 2004 now abandoned.

U.S. Application Ser. No. 10/767,930 claims the benefit of U.S. Provisional Patent Application No. 60/443,379 filed Jan. 29, 2003.

U.S. application Ser. No. 10/767,930 is also a continuation in part of U.S. application Ser. No. 10/060,001 filed Jan. 29, 2002, which claims the benefit of U.S. Provisional Patent Application No. 60/304,570 filed Jul. 11, 2001, U.S. Provisional Patent Application No. 60/336,602 filed Dec. 28, 2001, and U.S. Provisional Patent Application No. 60/346,418 filed Dec. 29, 2001.

U.S. Application No. 10/767,930 is also a continuation in part of U.S. Application Ser. No. 10/165,587 filed Jun. 8, 2002 now abandoned, which claims the benefit of U.S. Provisional Patent Application No. 60/297,204 filed Jun. 8, 2001, U.S. Provisional Patent Application No. 60/352,788 filed Nov. 28, 2001, U.S. Provisional Patent Application No. 60/336,602 filed Dec. 28, 2001, and U.S. Provisional Patent Application No. 60/346,418 filed Dec. 29, 2001.

The disclosure of each of the foregoing applications is incorporated herein by reference.

FIELD OF THE INVENTION

This invention relates generally, although in its broader aspects not exclusively, to methods and apparatus for presenting sports events to television viewers.

BACKGROUND OF THE INVENTION

The present invention belongs to a family of related systems that use metadata to control the playback of broadcast programming as disclosed in the previously issued patents and published patent applications summarized below. The disclosures of each of the following patents and published applications are hereby incorporated herein by reference.

U.S. Reissue Pat. No. Re36,801 issued to James D. Logan et al. on Aug. 1, 2000 entitled "Time delayed digital video system using concurrent recording and playback" describes a mechanism for continually storing live television or radio broadcast programs in an addressable digital memory and playing back the broadcast program after a variable delay period under the control of the viewer, permitting the viewer to pause, replay, and fast-forward (skip) live programming.

U.S. Pat. Nos. 5,892,536 and 5,986,692 issued to James D. Logan et al. describe systems which employ metadata to selectively store, manipulate and playback broadcast programming. Some of the arrangements and features disclosed in those two patents may be summarized as follows:

1. A remote editing station, which may be at the broadcast facility or at a remote location, classifies, describes or otherwise identifies individual segments of broadcast programming and sends metadata (sometimes referred to as "markup data") identifying and describing those segments to a remote client receiver. For example, the markup data may identify individual segments by specifying the source and the time of the original broadcast, or by specifying some other unique characteristic of the broadcast signal. The program segments may be TV, radio, or Internet programs, or portions of programs, including individual songs, advertisements, or scenes.

2. The communication link used to transmit the metadata to the client may take one of several forms, including the Internet, a dialup telephone link, the communications pathway used to carry the broadcast signals to the client, or other forms of communication used to transport the metadata to the client.

3. At the client receiver, the metadata is used to identify particular program segments that may then be manipulated in one or more of a variety of ways. For example, the metadata may be used to selectively play back or record particular segments desired by the user; to re-sequence the identified segments into a different time order; to "edit-out" undesired portions of identified segments; to splice new information, such as computer text or advertising, into identified segments for rendering with the program materials, or to substitute different material (e.g. dubbing in acceptable audio to replace profanity to make programming more acceptable to minors).

4. The client receives and locally stores incoming broadcast programming and uses the markup data to identify desired segments within the stored program materials. The local storage mechanism may advantageously include means for concurrently recording live broadcasting while replaying a delayed version of the previously recorded programming as described in U.S. Reissue Pat. 36,801 issued to James D. Logan et al.

5. The markup data can provide a detailed "electronic program guide" to the broadcast programming previously received and stored in a personal video recorder (PVR) or an audio storage device, permitting the user to selectively play back a desired segment or portion of the programming previously recorded.

6. The markup data may be used to create a recorded collection of desired segments extracted from the buffered broadcast, allowing the desired segments to be saved while the remainder of the buffered materials is discarded to conserve recording space.

7. Special markup signals may be selectively sent to individual subscribers based on his or her indicated preferences so that only preferred program segments are identified and processed. For example, a subscriber might request markup data only for sports and news.

U.S. Pat. Nos. 5,271,811, 5,732,216, and 6,199,076, and co-pending application Ser. No. 09/782,546 filed on Feb. 13, 2001, by James D. Logan et al. describe a program distribution system which incorporates the following features:

1. A host system organizes and transmits program segments to client subscriber locations.

2. A scheduling file of metadata (a "playlist") schedules the content and sequence of a playback session, which may then be modified by the user.

3. The content of the scheduled programming is varied in accordance with preferences associated with each subscriber.

4. Program segments are associated with descriptive subject matter segments, and the subject matter segments may be used to generate both text and audio cataloging presentations to enable the user to more easily identify and select desirable programming.

5. A playback unit at the subscriber location reproduces the program segments received from the host and includes mechanisms for interactively navigating among the program segments, including jumping from segment to segment in both forward and reverse directions.

6. A usage log is compiled to record the subscriber's use of the available program materials, to return data to the host for billing, to adaptively modify the subscriber's preferences based on actual usage, and to send subscriber-generated comments and requests to the host for processing.

7. Voice input and control mechanisms included in the player allow the user to perform hands-free navigation of the program materials and to dictate comments and messages, which are returned to the host for retransmission to other subscribers.

8. The program segments sent to each subscriber may include advertising materials, which the user can selectively play to obtain credits against the subscriber fee.

U.S. Patent Application Publication No. 2002/0120925 A1 published on Aug. 29, 2002 (based U.S. application Ser. No. 10/060,001 filed by James D. Logan et al. on Jan. 29, 2002) entitled "Audio and Video Program Recording, Editing and Playback Systems Using Metadata" describes structures and functions used to provide metadata control over the recoding, editing and playback of audio and video programming, including the use of mechanisms at the user's location for creating metadata which may be used in combination with metadata provided by an external source, for editing metadata in various ways at the user's location, for automatically responding to user activity to generate new metadata which characterizes the user's preferences and which serves to automatically identify and describe (or rate) programming segments, and for responding in numerous ways to the available metadata to enhance the utility and enjoyment of available broadcast materials.

U.S. Patent Application Publication No. 2003/0093790 A1 published on May 15, 2003 (based U.S. application Ser. No. 10/165,587 filed by James D). Logan et al. on Jun. 8, 2002) entitled "Audio and Video Program Recording, Editing and Playback Systems Using Metadata" describes systems for utilizing metadata created either at a central location for shared use by connected users, or at each individual user's location, to enhance user's enjoyment of available broadcast programming content. A variety of mechanisms are employed for automatically and manually identifying and designating programming segments, associating descriptive metadata which the identified segments, distributing the metadata for use at client locations, and using the supplied metadata to selectively record and playback desired programming.

SUMMARY OF THE INVENTION

The present invention takes the form of methods and apparatus for recording and replaying a televised sports event in a more format selected by the viewer. Although many of the techniques to be described are used to replay a football game, it should be understood that most of these techniques can in most cases be applied to other sports events as well, including baseball, basketball, hockey, boxing, etc.

In this system, the entire broadcast of a football game is recorded in a storage device which can be accessed by and controlled by the viewer, such as a program storage device in a cable or satellite VOD (video on demand), PVR (personal video recorder), nPVR (network personal video recorder) systems as described under "Platforms," below. In addition, related program content which supplements the broadcast version of the football game may be made available, such as program content obtained form sources such as league cameras shooting footage for the coaches, interviews and background material on particular players or subjects, tutorial materials for explaining topics which may be unfamiliar to a particular viewer, advertising and promotional materials, and the like.

In the description that follows, user functions are typically selected using a hand held remote control unit (which will be referred to simply as a "remote"), often from menu selections or other visual indicators presented on a conventional television monitor; however, voice commands, touch screens, or other input means, may also be used. Personal computer (PC) systems which are connected to the television set or set top box, and connected to a server by some mechanism such as a Web interface, may be used to retrieve metadata and media content, set up user preferences, make catalog selections, and/or set up system parameters. When a remote or other device employing "buttons" is used, the manner in which buttons are associated with functions can play an important role in making the user interface intuitively easy to use, as illustrated in the examples which follow.

Metadata created either automatically or by human editors after the live sports event but before the playback is employed to identify the starting and ending points of segments of the stored broadcast and supplemental programming. Additional metadata in the form of "playlists" may be used to selectively play back selected sequences of these segments for the viewer, potentially in a different order than the sequence in which the segments were originally broadcast and recorded. In addition, the user is presented with a segment selection guide which is displayed to the viewer and which enables the user to selectively control which segments, or which sequence of segments (playlists), are reproduced. The metadata will typically be created as early as possible, but it is also likely that more metadata will available for any given segment as time passes; therefore the longer a viewer waits to watch the game, the more developed the playlists may become.

BRIEF DESCRIPTION OF THE DRAWINGS

In the detailed description which follows, frequent reference will be made to the attached drawings, in which.

DETAILED DESCRIPTION

Platforms

The system for recording and playing back sports programming may be used on a variety of different platforms:

1. A Video on Demand (VOD) system with storage at the headend and where viewing would be totally time-shifted; that is, the sports programming would be stored in its entirety in a VOD video server before being made available to subscribers.

2. A networked Personal Video Recording (nPVR) system where the storage is again at the headend and viewing might be only partially time-shifted (that is, the game may still be in progress as the viewer begins to view the game, normally from the start, on a delayed basis).

3. A Personal Video Recorder (PVR), where the storage is local and the game may be partially or totally time-shifted.

4. An Satellite Video on Demand system where content is specifically broadcast in order to be placed in storage at the subscriber's location, typically in a PVR that may be incorporated into a satellite receiver. The satellite provider may choose which programs are downloaded, often during nighttime hours so that they will be available to viewers on demand the following day (and thereafter until deleted).

Each of the foregoing platforms is described in more detail in U.S. Patent Application Publication 2003/0093790 A1 published on May 15, 2003. As described there, and in the other patents and applications identified in the "Background" section above, metadata may be created by human editors or by automated techniques which subdivides a program, such as a broadcast sports event, into segments. The metadata identify the location and extent of each segment, and may include text labels or other descriptive information characterizing individual segments. Segments may be described with short text labels (called "slugs," "tags," or "labels") which may be displayed as a segment "index" or "guide" on the television monitor. Using the remote control to generate content navigation and selection commands, user may first select a playlist that presents all or selected parts of a sports program, may jump from segment to segment in either direction, or jump to any desired segment listed in the displayed segment guide, and thereby interactively control the presentation of the event.

Figure 1:
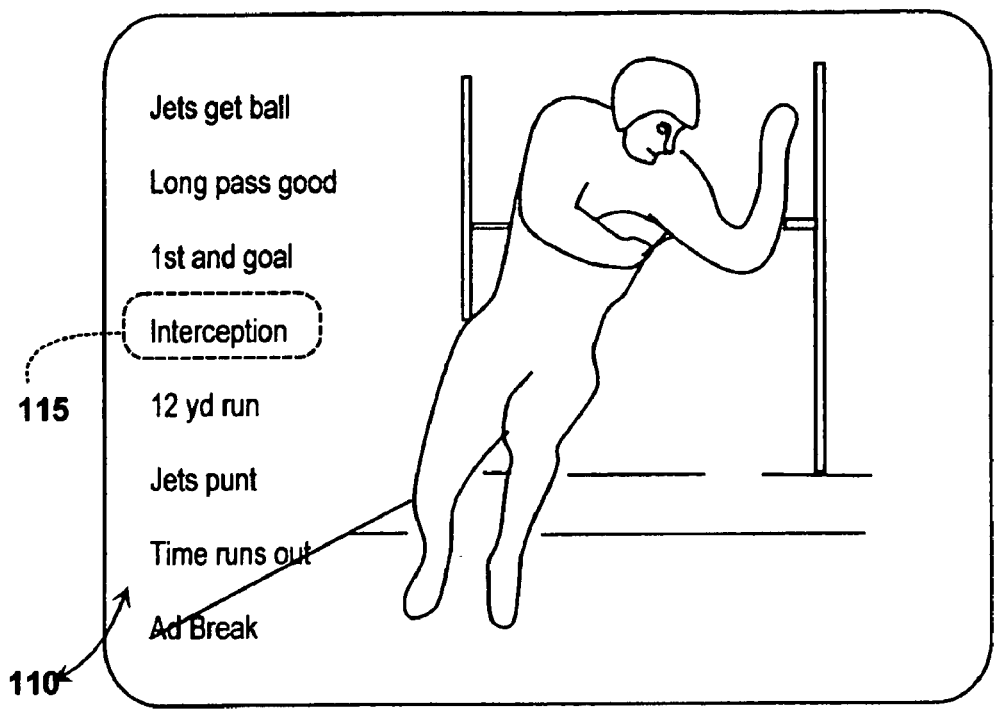
FIG. 1 shows a full screen presentation on a video presentation device of a sports event with a segment guide overlaying the media content image.

As shown in FIG. 1, the segment index or guide, as seen at 110, may consist of a "transparent overlay" of which shows all or part of the segment labels that make up the playlist as list of text labels that overlays a full screen presentation of the content. The particular label of "slug" that describes the currently playing segment is preferably highlighted in some fashion as illustrated at 115 so that the user can visually associate the segment currently being played with the items on the list. By using the remote, the viewer can move an on-screen "cursor," or move the highlighted selection 115 to a different segment label and then, using the select button or the like, switch the playback to the selected segment. If the segment list is longer than the space allotted on the screen, it can scroll so that the highlighted segment label remains visible on the screen. Note that the segment label selected by the cursor may be indicated by one form of highlighting (e.g. a special text or text background color) while the segment label for the segment being viewed may be identified by a second mode of highlighting, such as a graphical pointer or icon positioned at the playing segment label. The highlighting mechanism may change to provide additional information as a navigation aid. For example, when segments showing plays when a particular team is on offense may be identified with a highlighting icon that is that team's logo. Instead of an icon, the currently playing segment might be displayed in another color, or be indented or other placed in a different area of the screen, be displayed in a differently colored box, etc. Also, there might be a separate place on the screen that explicitly tells the user the segment slug of the currently playing segment. The currently playing segment indicator (whether it be icon, graphic, color, etc.) should automatically update as viewing goes to the next segment in the playlist.

Figure 2:
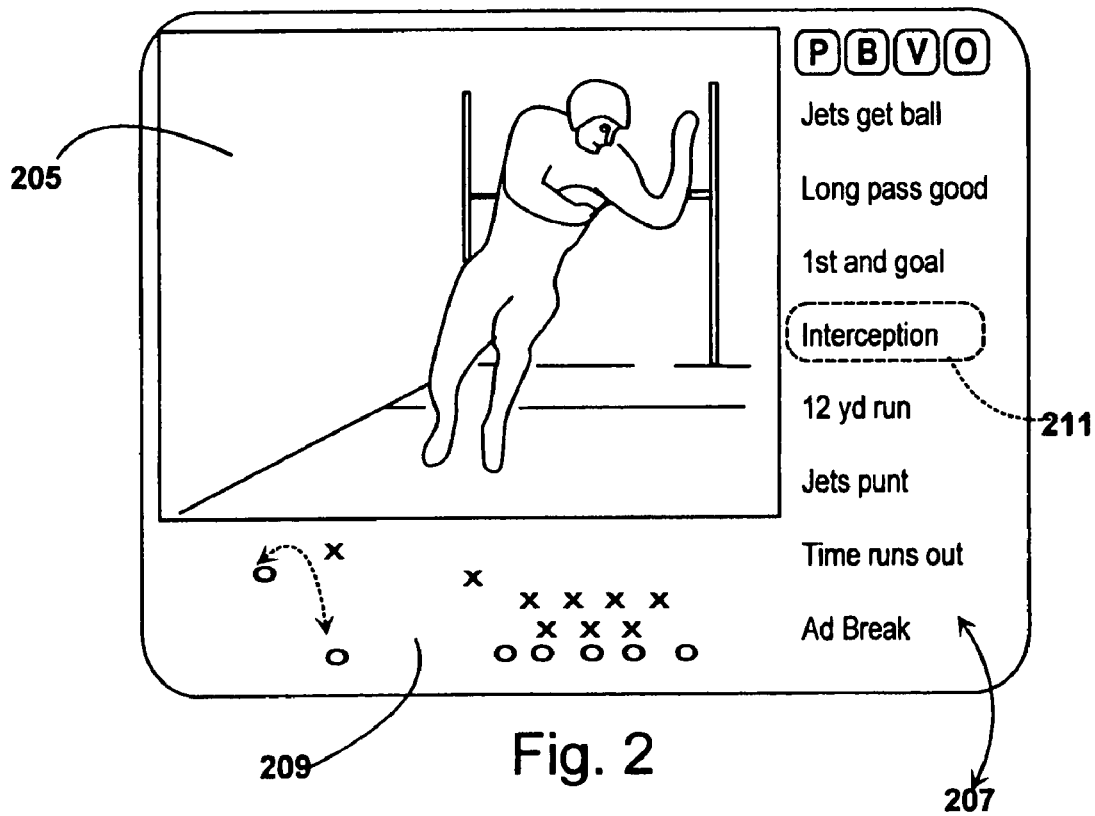
FIG. 2 shows a display screen separated into panels including a video viewing area, a segment guide area, a toolbar, and an information area.

As shown in FIG. 2, the screen display may also be divided into panels containing information and menus. The video image or "picture" of the segment being played is reduced to the size shown at 205, making room for a vertical panel at 207 to the right of the picture, as well as room for an information panel seen at 209 below the picture. The separate panels insure that the metadata-based information displayed on the screen will be readily visible, which may not always be the case with overlaid characters, and that the added information will not obscure the picture.

It should be noted that the viewer may elect to return the display to an unobstructed full screen view at any time, and likewise may redisplay the paneled version at any time that the user wishes to view the extra information provided by the metadata, or to navigate to a new segment, or perform some other function. In the fullscreen mode, the short "slug" or a longer description of the segment may be shown (or not, as selected by the viewer) in much the same way that close-caption text appears on screen when requested.

As seen at 220 in FIG. 2, a four-button toolbar is displayed in the upper right-hand corner of the screen. The four buttons are labeled "P" for Playlist, B for Bookmark, V for Vault and O for Options. By "clicking on" the P button, the user can display a list of playlists which are available for that program, and if desired, switch to a different playlist. By clicking on the B button, the user can "bookmark" and later more easily return to the position currently being shown. By clicking on the V button, the user may place the segment currently being played in the user's private "vault" which stores content the user may wish to view later. Finally, by pressing 0, the user can call up an Options Menu which allows the user to select options and store preference data which will guide the system's actions thereafter.

Figure 3:
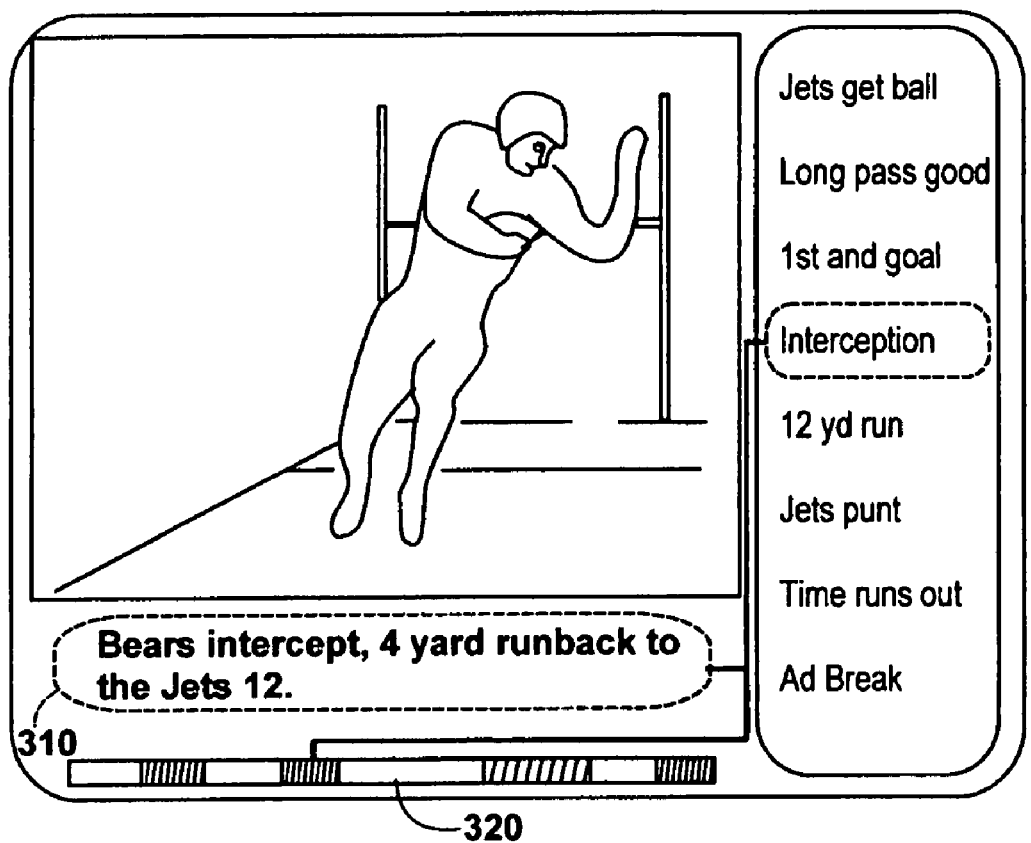
FIG. 3 shows a display screen which uses the information area to provide more detailed information about a highlighted segment on the segment guide.

The information panel seen at 209 may be used to present a variety of different kinds of information about the game, including a "chalk talk" description of the play as illustrated at 209. As illustrated at 310 in FIG. 3, the information panel may also be used to provide a more detailed text description of the segment, an a graphical display which indicates the relative position and length of each segment compared to other parts of the playlist. Finally, the information panel may be used to show "scoreboard" information at the time of the segment, such as the down, yards required for a 1st down or to reach the goal, ball placement, number of timeouts remaining, whether or not there was a flag on the play, etc. This scoreboard information may provide a useful way to scan a playlist to identify and play action of particular interest to the viewer.

The information panel seen at 209 may also be used to present advertising, which may occupy all or part of the information panel, depending on the need to present other information.

In accordance with the invention, playlists supplied to the user by the content provider (such as a cable VOD or satellite provider) can be used to control the presentation of a special version of a sports event. Playlists that can be used to advantage in presenting sports events include the following:

Snap-to-Tackle: This playlist identifies and replays only those segments of a football game which depict play when the ball is in motion. Typically, presenting a football game to a viewer under the control of a "snap-to-tackle" playlist condenses the game down to about twenty minutes. The precise beginning (snap) and ending (tackle) of each play is selected by a human editor using the following guidelines: if players are "in motion" before the play, that footage is left in; if something extraordinary happens after the play, that is left in as well (these tail-endings might include treating an injured player or the handling of a penalty—sometimes skipping to a scene where the referee announces the penalty). Another example of material left in by a snap-to-tackle playlist might be a short celebration after a sack or in the end zone after a score. In both cases (before and after the play), time might be added to allow for the announcer to complete a sentence. Although the editor has discretion to leave in certain material in addition to events which occur during a play, the editor would not delete any of the between the hike and the tackle.

Clock-in-Motion: This playlist presents a condensed version of the game which lasts about an hour and deletes the broadcast time taken for pre-game, halftime, and post-game shows. It also drops timeouts, penalty discussions, and other segments recorded when the game is not in progress and the game's official timekeeper's clock is not moving. Exceptions would be scenes where the referee is announcing a penalty or other important information is being conveyed to the audience.

Highlights: This playlist presents a highly condensed version of the game, showing only the "best" or "most interesting" selected by the human editor to reduce the game to perhaps five minutes in duration.

Most Important Plays: This playlist presents a highly condensed but still "structurally complete" game, showing only the most important plays of each drive (each set of downs). This playlist varies from the Highlights playlist above which shows the best plays regardless of when they occur. For instance all the Highlights action could occur in the fourth quarter. In the Most Important Plays playlist, however, the structure of the game is preserved as some representative plays are shown from each drive. A variant of this playlist would vary the amount of time per play depending on the outcome. For instance, if a pass were dropped, that would have very tight editing. If the pass play was for a first down, more time before and after the play would be left in.

Player Spotlight: In this playlist, the system pulls out and replays segments that are associated with specific players. A segment, or play, can be associated with more than one player and thus be used in multiple, different playlists devoted to different players. To access a particular player, the viewer displays a menu of players corresponding to the active roster. Individual players may be represented by name, picture, position, or any combination of these. The user may then select a playlist that plays only those plays, interviews, etc. that have been identified in the metadata as relating to the selected player of interest.

Other Highlights: Player Spotlights would be one example of "highlights" available using the system. A more generalized model of recombining stored segments would allow viewers to assemble playlists of highlights by player, team, play-type (e.g., hit, pass, or punt), or game situation (e.g. third downs). Furthermore, the highlights-could be assembled across a single game, a library of recorded games representing a team's season-to-date, or recordings stored for games recorded across the whole league in the case of play-type, game situation, or other non-player or team construct.

Best Hits: In this playlist, the "best hits" of the game being viewed are replayed. Similarly, other playlists may be used to identify highlights of other types of plays, such as passes/receptions, interceptions, turnovers, kickoffs, etc.

Downs and Yards: The "slugs" or labels presented by this playlist shows the down and yards-to-go (e.g., "3rd and 7yds"). This is particularly important for viewers whom have not seen the game or do not know the outcome. These viewers may not want the suspense of the game spoiled, and if they are shown a tag that says "quarterback sacked" or "touchdown pass" before they see the play, then the suspense is largely lost. So, tag descriptions that simply tell the field position at the start of the play are less likely to reduce the suspense of the game, particularly when the content is viewed in Fullscreen mode and the user cannot see the other/neighboring tags. Note that this type of playlist concept applies to other sports as well (e.g., a segment description in a baseball playlist might merely identify the inning, a stock car race playlist might indicate lap count, a golf playlist might identify the player and the hole being played. In short, this kind of playlist contains information that is known before the action shown in the segment actually happens, and hides the result of the play itself.

Other Playlists could include:

The complete game in Play-by-Play mode organized by quarter then play;

The complete game broken down drive-by-drive, with each drive further being broken down by play;

The complete game organized around the "story of the game" with distinct chapters not necessarily related to time, for instance: "Scoreless first quarter," "Patriots injury," "Patriots roar back," and "Opposition collapses" could all be chapter titles;

The complete game, but without commercial breaks. This playlist allows a provider to show sports content from the "back-haul feeds" in which commercial breaks in the live broadcast are dead-air (devoid of content) and not intended for viewers in that form. The complete game playlist, when presented, presents the game continuously, eliminating the commercial breaks.

The complete game, but containing only that content which is rights-approved for post-broadcast and/or on-demand viewing. This is particularly important for cases in which certain parts of the game (e.g., music playing in the stadium or on-air, in-depth coverage or background stories assembled by the broadcaster, etc.) haven't been cleared, so these pieces of content must be excised. This version of a complete game playlist provides an efficient means of presenting the content without producing a fully edited version that removes the uncleared content.

Scoring drives or scoring Plays only;

Plays in the Red Zone (ball inside the 20 yard line) only;

Third Down Attempts only;

Fourth Down Attempts only;

Special teams plays (kickoffs, field goals, and punt returns); and

Plays (or series of plays) in which the lead changes.

Other sports will have other playlists that apply specifically to that sport. For example, a golf match could have a "hole-by-hole playlist" where the content is re-arranged by hole, and the viewer watches how every player did on that hole before viewing the next hole. Also golf might have a "Player Playlist" where all the shots from that player are shown before viewing shots from another player.

The term "playlist" is typically a continuously-viewed collection of individual video segments, each with a start and end time. However, a playlist can be formed by start times alone, without end times. These start times act as bookmarks into the video. When viewing a "bookmark-type" playlist, the user will see the entire video from start to finish, and not a subset of the video. The viewer can select a segment, or hit the Next or Prev button, to jump to the next segment, but a bookmark-type playlist does not make these jumps automatically. It ignores segment end times and keeps playing. In mechanisms that require the end point of a segment to be known, the bookmark that marks the beginning of the next segment can be used to identify the location of the ending of the prior segment. Thus, unless otherwise apparent from the context, bookmark style playlists provide the same functions and features as playlists which include metadata that identifies both the start and ending, or the stare and duration, of a segment.

It should also be noted that, while a playlist may be used to selectively play back and perhaps reorder the play back of segments, the same effects can be used by employing the metadata to actually create a concatenation of the identified segments as a revised version of the original content. Unless otherwise apparent from the context, then features and functions described in this specification can be applied to metadata playlists, bookmark playlists, or metadata edited, recorded versions of the original sports event content.

New Voiceovers

Condensed versions of games often eliminate much of the audio track, which can lead to a choppy feel to the presentation. Thus, the metadata included in a playlist may specify a new audio track to be substituted for the original audio presented with each segment. This audio track would be laid down in such a way that there were no "audio seams" that straddled segments. That is, each segment would have a standalone audio track allowing viewers to jump from segment to segment without abrupt breaks in the announcer's flow. New audio segments should be captured or created so that they do not require the context of any particular prior or following segment to be understood, enabling segments to be assembled in a variety of different ways by different playlists such as those listed above.

Navigation Features

Blind Navigation

When in Full Screen Mode (without a visible segment guide being displayed—but with the optional display of the description of the segment currently being shown), the viewer can navigate in the same fashion as in Indexed Mode (when a segment guide is displayed). That is, the viewer can cursor to another segment several segments ahead or behind using the Up or Down arrow keys on the remote, and then pressing the Select Button to view the desired segment. Instead, this navigation could be using a special Next button that is a separate, unused remote control button, or the Next button could be simply an arrow button (e.g., right arrow), without the need to press Select. The picture presentation works the same way in Full Screen Mode that it does in Indexed Mode, but the viewer can't see the name of the segments that are being navigated.

The playlist navigation mechanisms described in U.S. Pat. Nos. 5,271,811, 5,732,216, and 6,199,076 discussed in the background section above may be applied to advantage in performing blind navigation of a sports event playlist.

Replaying the Current Segment: To get to the back to beginning of the currently playing segment when in Full Screen or Indexed Mode, the user would hit the Up arrow and then the Select button. To go back to the beginning of the previous segment for instance, the viewer would hit the up arrow twice and then the Select button. Alternatively, a special Previous button that is a separate, unused remote control button could be employed, or the Previous button could be simply an arrow button (e.g., left arrow), without the need to press Select. When the viewer presses a Previous button, the viewing jumps to the start of the previous segment. If the user is currently viewing video that is within a defined and/or configured number of seconds from the start of a segment, then the jump takes the user to the previous segment in the playlist. However, if the user is currently viewing video in excess of this defined and/or configured value, the jump takes the user to the start of the currently playing segment. This action is similar to that used in conventional CD players and DVD players when browsing and navigating the audio and video tracks on optical discs, and provides a mechanism that is familiar to viewers when applied to the navigation of segments in a playlist.

The Next Button: The viewer may wish to see the game in Full Screen mode without the index being visible. In this mode, the viewer can navigate blindly by skipping ahead to the next segment using the Next button, which advances the viewer ahead to the next segment. Because the Next button would be used so frequently, it is preferable to the Next button be a physical button on the remote, such as the Remote's Select button, or the Next button may be a separate, unused remote control button. Whenever the viewer hits the Select button the video would move on to the next segment while in Full Screen mode. Furthermore, when in Indexed Mode, the Select button would operate in a similar fashion. If the cursor were still on the segment being viewed, hitting the Select Button would advance the video to the next segment. If the viewer, however, had already advanced the cursor to another segment, hitting the Select button would select this highlighted segment, rather than causing the display to move to the next segment on the playlist.

Cross Show Navigation: The system envisions a large database of video being available to viewers consisting of all recent league games and an archive of older games. Viewers could navigate through the database via video hyperlinks displayed on the system's UI in a number of ways. For instance, when watching a Best Hits playlist from the current game, the info-box might display icons representing the players involved in the play. Clicking on these icons might offer viewers the opportunity to see great plays they made in other games. Once a viewer was watching plays from these other games, there would be further opportunities to watch parts of those respective games, or the whole game itself. Another way to navigate would be to invoke the Info button (a physical button on the remote—see below) at any time. This might present opportunities to go to other related games or parts of the video database. This sort of "chain hyperlinking" would allow viewers to peruse the database while watching actual playlists. Other navigation means would be traditional menus of the league or team schedule from which users could access specific games, or menus of cross-game playlists, such as compilations of Best Hits. The context of a scene or play could provide the basis for the hyperlinking; for instance, in the middle of watching a ski race, the user could hyperlink to see how the other skiers performed in the same section of the course currently being viewed. For golf, this could be to see how other players fared when facing the portion of the course.

The hyperlinking itself could be invoked using a special button on the remote control. When the user is presented with an on-screen notification (alert, icon, text, graphic, etc.), pressing the button would activate the hyperlinking to another screen that shows the user the options of to where they can hyperlink (e.g., what relevant playlists are available for viewing).

Transitions between Segments

Transition interstitials (e.g., graphics, color, audio, and/or video) may be presented to the viewer when browsing the tags within a playlist, jumping between segments (manual or automatically), or switching to another playlist. These interstitials would serve to add context to the viewing experience, so that the user has an indication of how far in time they are jumping forward (the time in question could be displayed as a graphic showing game-clock-time, broadcast-clock-time, or percentage-of-asset being viewed). Other graphical displays might be used, such as a 1 second video of a New England Patriots player rushing from one side of the screen to the other, which would be displayed immediately before the user sees the next discontiguous program segment in a New England Patriots game playlist.

The presentation of such interstitial content can accompany both manual browsing (that is, clicking on index segments or clicking the "next segment" button) as well as automatic browsing (that is, just watching a playlist and having the system automatically make the jump to the next segment). However, the latter automatic-browsing case would benefit more from the addition of the interstitial, since the user is not the one causing the jump in time, and therefore they might be lost without the context supplied by the interstitial.

Preview Mode

A user may dynamically select "Preview Mode" in which only the first part (e.g., 10 seconds) of each segment in a playlist before viewing is automatically jumped to the next segment in the playlist. If the user presses a special remote control button (or any one of a number of buttons), play can continue normally and Preview Mode would be temporarily or completely disabled. This mechanism is analogous to the "scan mode" in which car radios scan from station to station, playing each for a brief period, unless the scanning is interrupted so that the user can continue to listen to a program of interest. Alternatively, the system may play a predetermined representative portion of a segment other than the beginning which may be deemed by the metadata provider to provide a better preview of the segment. In that case, when the preview mode is interrupted, playback begins at the beginning of the segment being previewed.

Hierarchical Segment Guides

A segment guide may employ "Segment Groups" to create parent-child relationships. Segment Groups present the playlist's slugs (short on-screen descriptions of the segments in a playlist) in a hierarchy with a number of segments grouped together with a single group label. For example, all the plays within one drive of a football game (or one inning of baseball, one lap of NASCAR, one hole in golf, etc.) would be contained in a Segment Group that has a title representing that football drive along with supplementary information, such as game clock or game quarter (e.g., "Pats Drive 1-Q2", or "Pats D1 26:30"). Overall, this serves to organize the segments, and makes it efficient for the user to peruse a long playlist by simply looking for the group in which they are interested, and then searching within that group for the play they wish to view. The relationship of Segment Groups to Segments is analogous to the relationship of file folders to files in computer file systems. By organizing segments into groups, the viewer can first search for the desired group, and then find a desired segment within that group, which is much faster than searching a single long list of segments.

Some playlists may have all segment slugs organized in Segment Groups, but other playlists may have only a portion of the segments (or none of the segments) organized in this way. Generally, the most benefit is derived from applying Segment Groups to long playlists that are associated with content that it partitioned by some construct such as innings, periods, drives, holes, laps, etc. Short content often doesn't need a segment group. For instance, a post-game news show might be only have 10 segments with 10 slugs; organizing 10 segments for easy and efficient perusal is not worthwhile since the user can browse them easily enough without the hierarchy of Segment Groups.

Two different methods for the navigation of Segment Groups are provided, and are called "bi-axial" and "show-hide."

Bi-axial navigation is commonly used to permit VOD subscribers to search for videos available for viewing, and is thus familiar to VOD viewers. Bi-axial navigation can also be applied to advantage to provide a consistent way in which viewers can browse Segments and their Segment Groups. In this application of bi-axial navigation, the user has at his/her disposal four arrow buttons on a remote control (left, right, up, down), and a select key. Using one pair of arrow buttons (either left & right, or up and down), the user can scroll through an on-screen list of Segment Groups that are arranged along the axis that correspond to the buttons they are using (i.e., left & right arrows would scroll through a horizontal list of Segment Groups, and up & down buttons would scroll vertically arranged Segment Groups titles). Once the user finds a particular Segment Group of interest (e.g., a particular drive in a football game they wish to view), they can use the other set of arrow buttons to scroll in the other axis to find a particular segment within the Segment Group (e.g., if left & right scrolls a horizontal Segment Group list, then up & down would scroll a vertical list of segment slugs that reside in that Segment Group). Once the user has located the segment of interest, they press another button (e.g., the Select button on the remote control) to select-and-view the desired segment. Segment Groups titles themselves often benefit from having a small graphic icon next to the Segment Group title to denote more information about the contents of the Segment Group, and to declare the title as being that of a Segment Group in the first place. For example, Segment Groups that are drives in a football game might have a helmet of the team with the ball placed next to the Segment Group title, which tells the user very quickly who has the ball and that it is a drive Segment Group. Another example is that if the drive ended in a touchdown, then a different icon (e.g., goal posts, or a graphic that says "6pts") could be displayed next to the Segment Group title to denote that the drive ended in a touchdown.

Show-hide navigation is analogous to the opening and closing of file folders used to find files in a computer graphical interface, such as Windows®. This navigation method provides a familiar way in which a view can locate and play particular Segments and Segment Groups in a hierarchical playlist. The viewer is shown with a list of Segment Groups titles on the screen. The user uses a pair of arrow buttons (either left & right, or up and down) to scroll to a Segment Group of interest, and then they press another button (e.g., Select button, or one of the arrow button not used for scrolling the Segment Groups) to "open" the Segment Group, thereby revealing on-screen the segments that are contained in the selected Segment Group. On-screen, the segments appear in a way that denotes to the user that the segments are contained within the Segment Group. This can be accomplished in a number of ways: listing the segments below and indented from the Segment Group title; listing the segments below and in a different color than the Segment Group; showing an icon next to the segments and/or showing an icon next to the Segment Groups with the icons being different. When the segments are shown on-screen after the Segment Group is "opened", the segments could animate into place, thereby reinforcing in the user's mind that the segments came from the action of selecting the Segment Group. When the user is done browsing and/or viewing the segments within a particular Segment Group, they have the option of either, a) actively "closing" the segment group by highlighting the Segment Group title and pressing a button (e.g., Select button, or one of the arrow button not used for scrolling the Segment Groups) thereby hiding the on-screen segments that are contained in the selected Segment Group, or b) browsing to a different Segment Group and selecting that Segment Group to "open" which cause implicitly causes the previously "opened" Segment Group to "close". Segment Group titles can have an icon next to them to denote they are a Segment Group, and the icon can change when a particular Segment Group is "opened" or "closed". For example, a "+" or sideways-facing arrow could be used when the Segment Group is "closed", and when the user selects the Segment Group to "open" it and reveal it's segment contents the icon could change to a "–" or downwards-facing-arrow.

Mini-Nav Bar

The "Mini-Nav Bar" provides a further navigation method which allows a viewer to navigate when the display is in fullscreen mode (that is, the video consumes the entire screen). As noted above under "Blind Navigation," the user may navigate in full screen mode without seeing segments descriptions/titles. This isn't always optimal. In fullscreen mode, users will sometimes want to see segment descriptions to know if they care to watch the segment. Displaying the segment titles in fullscreen mode is accomplished through the "Mini-Nav Bar". This feature is a small graphic bar displayed near or at the bottom of the screen, either as an overlay on-top of the video or as a bar across the bottom that slightly vertically shrinks the video image. The graphic is either always present, or more optimally it appears only when the user presses a remote control button, which can be either a button press that explicitly brings up the Mini-Nav Bar so the user can view it, or a button press (e.g., arrow button) used for segment browsing and the act of segment browsing automatically makes the Mini-Nav Bar appear to display the segment title being selected/browsed to. After a timeout (e.g., several seconds) the Mini-Nav Bar disappears, leaving only fullscreen video.

In the Mini-Nav Bar graphic, one or more segment titles are shown. If more than one segment title is shown, some indication is given to the user that identifies the title to which the user is browsing and/or selecting. That is, a highlight or icon or coloring or some other graphical element is used to denote the segment title that the user is about to select (or has just selected).

Alternatively, the Mini-Nav Bar may appear every time a new segment in the playlist starts to be viewed. So, instead of an explicit button press, or implicit appearance due to browsing in fullscreen mode, the Mini-Nav Bar could be displayed briefly every time the user sees a new segment. This could be entirely without user intervention, as the next segment in the playlist is shown, the Mini-Nav Bar automatically pops up to alert the user that:

(a) a new segment is going to be shown,
(b) this new segment is possibly forward in [broadcast] time of the stream, making the viewer aware of a time discontinuity in the viewed stream and
(c) the title/description of the segment that is starting to be viewed.

The manner in which the Mini-Nav bar is presented may be configured by the viewer or the provider, either dynamically or statically, to control:

a) where on the screen the Mini-Nav Bar is displayed. The Mini-Nav Bar's default position is at the bottom of the screen, but for particular types of content that has action at the bottom of the screen which would be obscured by that placement of the Mini-Nav Bar, or simply because of user preference, the graphic could be displayed in other areas of the screen.
b) the time duration after which the Mini-Nav Bar disappears may be varied. This could be set as the number of seconds that the Mini-Nav Bar is shown, and may vary depending on the amount of time which the viewer will need to read or understand the segment description presented.
c) the time after the start of the play that the Mini-Nav Bar first appears. The default behavior is to show the Mini-Nav Bar when the user causes it to appear (explicit button press, or implicit in browsing in Fullscreen mode). The user could desire that the Mini-Nav Bar not be shown until after a certain amount of time after the start of the play, so as to not ruin the suspense of what was about to happen in the play. This could be expressed as a time-after-start-of-play, or else set to show after the event described in the segment title actually occurs.
d) whether the Mini-Nav Bar automatically appears for each new segment in the playlist.
e) what segment title is shown in the Mini-Nav Bar. The user might want the suspense of the game kept, so they may not want to see what was about to happen in the upcoming segment, as described by the segment title (e.g., "Quarterback Sacked"). The user could configure whether they wanted a more objective title shown in the Mini-Nav Bar that didn't ruin the suspense, as described above in the "Downs and Yards" playlist concept above. For example, instead of "Quarterback Sacked" the Mini-Nav Bar might be configured for suspense mode, and the user is presented with "4th and 3yd" instead.
f) the number of segments shown in the Mini-Nav Bar could be configurable. This is particularly useful when the user has not seen the game and wants to preserve the suspense; by setting the Mini-Nav Bar to a single segment, the user will not see neighboring segment titles, which could ruin the suspense by telling the user what the next play will be.
g) the way in which multiple segment titles are arranged in the Mini-Nav Bar. If there are multiple segments displayed in the Mini-Nav Bar, the currently highlighted and/or selected segment could be in the middle, left or right end of the list of displayed horizontally segments (or middle, top, or bottom if the Mini-Nav Bar lists segments vertically). The default behavior is currently to set the highlighted and/or selected segment title in the middle of the list. This has the unfortunate side-effect of showing the viewer neighboring segment titles, which could ruin the suspense of the game. Therefore, the Mini-Nav Bar could be configured (statically or dynamically by the user) to display multiple segment titles in a different way to preserve the suspense. For example, the highlighted and/or selected segment title could be on the right side of a horizontal list. That was a user could through the Mini-Nav Bar browse to and select a segment to view, but in doing so never sees the segment one further to the right which is associated with the next play. If the segment the user browses to and selects is "4th down attempt", then they wouldn't see outcome that is described in the now-off-screen segment title.

Browsing and selecting segments in fullscreen mode with the Mini-Nav Bar could be accomplished in two ways: floating, or fixed. In the floating method of Mini-Nav Bar operation, the user is allowed to browse (e.g., with remote control arrow buttons) to a new segments before they explicitly select it (e.g., with the remote control Select button), thereby jumping to the segment of interest. In the fixed method of Mini-Nav Bar operation, every time the user browses to a new segment (e.g., with remote control arrow buttons), the jump to the new segment automatically occurs. In this way, there is no way to, say, browse and one-step jump from the first quarter to the third quarter of a football game; the operation is more like a Next button ("next, next, next, etc. etc. etc.") where each segment is seen (that is jumped to).

Interactive TV Capabilities

The Info Button: This button on the remote, on-screen commands, or voice-activated functions would allow the user to branch to additional content from within a given segment. For instance, if the Info button were invoked while watching highlights of a given player, a short menu would appear presenting choices to see this player's highlights from other games. We envision the best way to implement this function would be to hit the right arrow key when the viewer has placed the cursor on the appropriate segment. (This is consistent with a model that using the right arrow takes the viewer to successively greater levels of details.) An "i" could appear to the right of segment slug if there was extra information about the segment to be accessed. If all segments had information, the "i" might appear at the top of the UI or not at all, but not next to every segment.

The additional information will then appear in the information panel below the picture, or in the video space, in which case the video will automatically pause while it is displayed. Hitting the left arrow key removes the additional information from the display.

Running Statistics: Some advanced viewers may be interested in having access to a continuing stream of personalized statistics. For instance, a viewer might wish to see at any moment in a game, either on-demand or in a pushed basis, statistics on: passing yards vs. rushing yards, quarterback ratings, third down conversion ratios, etc. It is envisioned that a viewer could set up a rotating sequence of such statistics with the viewer picking the statistics of interest and the order in which they would toggle through the appropriate window. The viewer could also specify at which times the video would be paused to let the statistics be viewed. Viewers could toggle through the list of statistics in one of the following ways:
1. The one-click method would use the right arrow to toggle through the various angles (under the theory that the camera angles represent another level of detail about the video). The Info use of this button would be terminated and that function could be accessed from an on-screen command.
2. Toggling through the Favorite button (if there is one)
3. Toggling through one of the A, B, C buttons
4. The various options could be offered as a menu in the banner ad space.

Look-Ahead Stories: A certain type of running statistical story would be feasible under a time-shifted scenario-one where the end of the story was known by the system in advance. Thus, if a running back ended up breaking, or coming close to breaking, a record by the end of the game, the system would know that outcome in advance and start to develop that storyline earlier than a live announcer would. Viewers would have the advantage of having displayed for them early in the game a chart showing total yards per-moment in the game versus the record. They would therefore be tipped off that this is a major story without knowing the outcome. Viewers watching the video for the second time, or ones who knew the outcome would have the benefit of following the storyline right from its inception. Whether the record is broken or not, the comparison is fun to watch right up to the end.

Segment-Related Content: Another use would be to use this space to provide a short narrative of what transpired in that particular segment. The text in this space could either be in addition to the segment "slug" (short on-screen segment description normally shown in a list), or could be a continuation of the slug. That is, when a segment is selected and/or highlighted, the first part of the description could be the short description in the segment index listing, and the remaining portion could be the continuation of text in the information area. If the information area is used for text or a narrative describing the segment, this area could be scrollable (i.e., via remote control arrow buttons) by the user if all the text did not fit on the screen, or the application could automatically scroll the text (much like the horizontally moving banner text now often used on news and sports broadcasts, but provided by metadata as part of the playlist).

Chalk Talks: Another segment-related use of interactive TV would be to display a "chalk talk" before, during or after a play. Such diagrams, as illustrated at 209 in FIG. 2, outline for viewers how a play work, who runs where and who covers whom on defense. Typically, the chart is comprised of "X's" and "O's". Such a diagram could be called up through use of the Info button mentioned above. A chalk talk diagram could also be dynamic. As opposed to a real chalk diagram, which is static, the disclosed system could show the X's and O's in motion as the play progress and even have accompanying audio explaining the play. The game video could be running at the same time. If the chalk talk window was in "focus", the pause and rewind buttons could be applied to reviewing the dynamic graphic. A chalk talk could include an audio analysis of the play along with on-screen graphics that are on-top of the video, much like sportscasters now often use pen-drawn on-screen graphics in football replays. This could take the form of a secondary audio, video, and/or graphics track (much like a secondary audio track of a DVD) that the user can turn on/off at any time via an on-screen toggle or remote control button. In addition to being dynamic, the diagram could also be interactive. Viewers could toggle over to the window displaying the diagram and once this window was in focus, the arrow keys could be used to highlight different players. Clicking on a player would bring up information on that player.

Drive Diagrams In addition to play-specific chalk talks, the system could also offer "drive diagrams" that graphically show the movement of the ball up and down the field. This type of graphic gives the user a "big picture" perspective on the game and would be particularly interesting to viewers watching the condensed game playlists. Viewers would be able to navigate through the video content using these diagrams by first toggling over to the window containing the diagram. Using the arrow keys, viewers could highlight the desired drive and click on it and thus bring up the video associated with the start of that drive.

"Learn The Game" Mode: When a viewer is new to football, or any other sport, it is often hard to learn the game. Using the broadcast itself as a learning medium has two disadvantages—it has to progress at the rate of the live game, limiting the amount of time available to explain events in detail, and it is a one-size-fits-all production, meaning it can't be tailored for the fraction of the audience that is not up to speed on details of the game. With time-shifting and pause capability, the viewer is able to put the system into "learn mode". In Learn mode, information is conveyed two ways.

For situations where the viewer "pulls" information from the system (i.e. using the Info button), the system would understand that viewer is trying to learn the game and offer the appropriate information as a result. In other situations the system is "pushing" information to the viewer, for instance when the ad banner box is filled with data that the viewer did not necessarily request. In this case, as well, the information would be tailored to the user's level of knowledge.

The information presented could be text, a graphic, a dynamic graphic, or a video clip. The information could also be "standard" or "custom". Standard information would be static data prepared well in advance and used for multiple games. Custom information would be data created to be associated with a specific moment in a specific game. For instance, a standard video clip could be a video clip showing a typical "face mask" infraction while a custom clip for the same topic could be an edited segment of the currently watched game (that is, a replay of the face mask penalty that was just watched). All these forms of information could be presented on either a push or pull basis. This static database of helpful hints could also be accessed at will through a more elaborate menu scheme. That is, if viewers wished to understand what a clipping penalty was, they wouldn't have to wait for one to occur, but instead would have the option of going to, say, the Options menu, and ferreting out the clip or text explaining this penalty.

Advanced Viewer Mode: In the same way that new football fans would want explanatory metadata about the game, experienced viewers might wish to have more advanced levels of data presented. To this extent, the system would also offer a similar Advanced Mode.

Some of the advanced statistics that might be offered include a summary of penalties so far in the game, a frequency table of which types of plays had been called so far, and a comparison of the types of yardage accumulated by each team.

Games for Viewers: Viewers would also be able to use the system's time-shifted interactive TV functionality to participate in games. In particular, they could pause the picture and enter a "Guess the Play" contest where a multiple-choice question would appear in the information area. Users would toggle to the area and navigate to their selected answer. A bet could be placed in jurisdictions that allowed gambling. In other locations, a virtual bet could be placed where the system would keep track of how much virtual money a viewer had won-such monies being exchangeable for prizes. Other games would involve multiple-choice trivia games.

IP-Based Interactivity: The system may use an Internet connection to retrieve and display text and image data from the web on the information panel alongside the cable-based main video window, or on the full screen. In this mode, the remote and the television may effectively operate as a web browser to allow the user to interactively locate detailed information to which the metadata provides contextual links, participate in games and chat sessions, etc.

When a viewer brings up an information screen, or supplemental programming of any kind, that will become the new focus of attention, the current video presentation should be automatically paused while the user is viewing the requested material. When the user exits this presentation, the video should be automatically put back into Play mode.

Similarly, if the user optionally clicks out (via clicking on the banner ad) to an ad video, the original video that they were watching should be paused and/or bookmarked. When the ad viewing is completed, the user re-joins the original video from the point where they clicked the ad.

Both of these speak to the idea of "pausing" at the point of OPTIONAL departure from the original on-demand content, so that the user returns to the same place.

Additional System Capabilities

Masking Outcomes

Often a viewer will not know, nor want to know, the score of the time-shifted game being reviewed. If the user wishes to be "kept in suspense," that preference should be ascertained as soon as the viewer entered the game presentation environment. If that preference is expressed, the system will endeavor to mask the outcome of the game from the viewer in one of several ways:

The first technique would have the system not display the to-be-seen portions of the playlist, only listing segments already viewed. In this mode, the viewer would pick the playlist to watch and let it progress in a linear way, only randomly accessing and replaying already-viewed segments, or using the Next button to jump ahead—but only a segment at a time. A segment is not listed in the Index until it has been viewed in its entirety or the viewer has skipped ahead. (If a segment label is displayed in advance, it might well give away the storyline.

A second method would involve using labels for segments that did not contain scoring information. This approach allows a viewer to jump ahead more easily but can still give away a sense of the game by virtue of merely seeing who has the ball, when a kickoff is made, etc.

Using a third method, the system could actually change the segment title that is displayed once the user sees the segment, as described in relation to the Mini-Nav Bar, above. For example, the user might want the suspense of the game kept, and not want to see what was about to happen in the upcoming segment, as described by the segment title (e.g., "Quarterback Sacked"). Consequently, before the segment is shown, a more objective title is shown that won't ruin the suspense (e.g., "4th and 3yd"). After viewing the segment, the more descriptive segment title that describes the outcome of the outcome would be presented.

Multiple Camera Angles

Although the system can be used to advantage to re-use, simplify, condense, or more easily navigate standard broadcast content, it may also be used to expand on the coverage available in an original broadcast. Additional footage could be obtained from systems designed for multiple camera angle use, network cameras whose shots were not broadcast at a given time; stadium cameras; and league cameras shooting footage for the coaches. While multiple cameras may be used to shoot any one given play, only one can be shown to viewers during normal broadcasts. A second or third, however, could used during replays. In a VOD environment, however, video from more than one camera angle could be stored on the server. The system's default camera angle would be the one used in the broadcast, however, by invoking a command, viewers would be able to select from a menu of available camera angles whenever those were available. It is envisioned that various methods could be implemented to let viewers access the multi-angle feature. These options are similar to those described above for allowing advanced users toggle through a list of statistical presentations. The user could specify the order of which the angles would appear when toggling by going to the set-up section of the Option menu. Each time the Right Arrow (if this was the method of toggling) was hit, the segment would start playing over again using the camera angle first on the list. Viewers could also specify camera angles by type of play or player featured, a feature that can't be offered to live viewers. For instance, a viewer could set up the system so that field goals are always shown with the camera behind the goal posts. Hail Mary passes would always be shown by stepping the camera back to capture the whole field. This latter example would offer the additional drama of tipping the viewer off that a dramatic moment was being set up.

Picture in Picture

A PIP (picture-in-picture) mode presents to or more games at the same time on the same screen. Multiple windows of video may be shown in a picture-in-picture fashion, or one game could be displayed in the main window while one or more secondary video feeds (either different games, or other programming) could be shown in the information space, or some other subsidiary window. Multiple views of the video would be useful in situations showing the game in the main window, while having the cheerleaders, crowd, or coaches shown in the information space. Alternatively, an entirely different game could be shown in the subsidiary window. The user could set up the presentation formats in an Options menu. Once set up, the viewer would then have different viewing "universes" controlled by one remote. When users invoked the standard navigation features such as pause, rewind, or fast-forward, the commands would apply to all the open windows at once (if the programming in the supplemental windows is associated with the context provided by the video feed in the main window. Alternatively, time shifting commands may be applied only to the window that is "in focus." Multiple camera angles could be invoked in each window in the ways described above. The viewer would have to toggle over to the respective window first, to put it in "focus", at which point the different cameras could be invoked.

Another possibility for a PIP setup would allow viewers to have more control over the source of the subsidiary images within or adjacent to the main video. Besides other cable broadcast sources (i.e., another game), a video feed or other presentation off the web to be used in the PIP (picture in picture display window). In this way, every viewer could have a unique viewing construct. In particular, relating to sports, a viewer would be able to "rent" a webcam that he or she could control. Thus, if friends were attending a camera, a community could be constructed by keeping a webcam trained on their seats while the game progress.

Multiple Audio Feeds

In addition to multiple camera angles, the system could also offer multiple audio feeds. Viewers could select the standard TV broadcast feed, as well as a radio broadcast feed or the audio broadcast at the stadium. In addition, users could overlay the stadium sound on any given feed for added effect. Another feed could be the audio captured from an on-field mike or a player's helmet. Viewers from different locations may want to select different radio broadcast feeds (e.g., viewers can get the feed of their home-town or favorite announcer).

As described in detail in described in more detail in U.S. Patent Application Publication 2003/0093790 A1 published on May 15, 2003. the system may employ a "community markup" mechanism that allows users to create special playlists (using the bookmarking feature), and then transmit those playlists to other users who may then view programming under the control of the supplied playlist. As analogous concept is "community audio" whereby one or more viewers, for compensation or for free, would offer their commentary on a game. Thus, a high school coach could add his spoken comments on a game in the system for benefit of his players, or a team player could offer his thoughts. In another case, a celebrity could offer his or her comments. Versions could be created that included comedic comments overlaid on part of the game in the same way that some music video stations offer Pop-Up comments during music videos. In another special version of audio, the new announcer, knowing the outcome of a play and the whole game, could give subtle hints as to what to watch.

Another feature could be the use of audio conferencing, so that viewers could enjoy watching a sporting event in the "virtual" presence of friends and family. The audio conferencing could be accomplished via regular phone, Internet link, or Voice-Over IP, all played through the set-top box and/or television audio.

Dynamic Configuration

The system may dynamically configure the playback for the amount of time a viewer indicates that he or she want to spends watching a particular video or playlist (e.g., setting the system to 22 minutes for a football game viewing session; setting for a "Slow", "Medium", or "Fast" viewing time on a Highlights Playlist; etc.). With this information, the system could select the playlist with the closest running time to what the user indicated they wished to spend viewing the video. Alternatively, the system could dynamically change a playlist's segment time or number of segments so that the viewer is presented with an overall running time that approximately matches their desired viewing time.

Additionally, the system could have an on-screen option (or a remote control button) that allows the user to request a speed up or slow down in the viewing experience. With this input, the system would dynamically alter the playlist being watched, or else could dynamically change the current playlist's segment times or number of segment, so that the viewer is presented with an overall running time that appropriately matches their desires.

Features Adapted to Sports Events

Other features described in detail in the patents and published applications noted in the background section above, may be adapted to sports programming.

The Vault function, invoked by clicking on the "V" button on the toolbar 220 seen in FIG. 2, allows viewers to add the segment currently being viewed (or highlighted on the displayed segment guide) and save them to a virtual personal storage area called the "vault." For a VOD system, such action does not result in the actual copying of the video to a separate location, but merely the storage of metadata that signifies that a segment stored on the central server has been "virtally" stored by the viewer. In a PVR system, the vault may contain a copy of the selected segment, or any segment in an identified program stored in the PVR may be copied before that program is erased. Certain segments can be designated as "highlights" and be automatically sent to a viewer's vault. The viewer could program the system to save these highlights by player, Fantasy Football roster, team, play-type, etc.

Bookmarking, invoked by clicking on the "P" button on the toolbar 220 seen in FIG. 2, allows viewers to bookmark the game themselves. This would take the form of bookmarking segments or creating new metadata serving as a new jump-to location. Alternatively, a viewer could delineate their own segment by bookmarking the beginning and end of a segment. These segments could be dropped into the Vault. Bookmarks may be associated with specific viewers.

Advertising associated with the broadcast of a sports event may be available to view in the sports presentation system. To encourage ad viewing, bookmarks denoting a new segment at the beginning of ads would provide an incentive for viewers to watch ads. Furthermore, the system may require viewers to watch ad content in proportion to the game content viewed. Consumers could opt out of this requirement by paying an extra subscription fee. Under any model, the fast-forward button may be disabled, disabled to prevent skipping over ad content that is associated with a segment, or slowed to discourage ad skipping. Another method to foster some limited ad viewing would be to require that the viewer click the "Next" button several times to get past an ad, with each click taking the viewer to a new position within the ad. The navigation could even be suspended for a brief period at each "stop" to allow the viewer to absorb some part of the ad content. The metadata may mark certain segments as mandatory, preventing them from being skipped except to skip to an entirely different segment, and in this way requiring that ad content be viewed as a condition for viewing designated program content. The metadata could be used to place "required viewing" attribute(s) in ad segments to maximize their effectiveness without hindering the "navigational progress" of the viewer more than necessary.

CONCLUSION

It is to be understood that the methods and apparatus which have been described above are merely illustrative applications of the principles of the invention. Numerous modifications may be made by those skilled in the art without departing from the true spirit and scope of the invention.

What is claimed is:

1. A method for offering an interactive game to a user based on a sports event, the method comprising:
    storing a sports event as a video program in a storage device;
    defining a plurality of video segments from the video program utilizing video metadata;
    playing the video program in a first area of a display, the video program configured to be played in a time-shifted mode;
    establishing a second area of the display as a video segment display area;
    in response to activation of the time-shifted mode, presenting an interactive game to the user based on the sports event to which the video segment metadata provides contextual links to the sports event, wherein the interactive game is displayed in the video segment area of the display; and
    accepting response of the interactive game from the user.

2. The method of claim 1, wherein the time-shifted mode is activated in response to an input from the user.

3. The method of claim 2, wherein the input from the user comprises pausing the video program.

4. The method of claim 1, wherein the interactive game comprises a multiple-choice question.

5. The method of claim 1, the method further comprising:
    accepting a bet on the outcome of the interactive game from the user; and placing the bet on behalf of the user.

6. A method for displaying advanced statistics to a user based on a sports event, the method comprising:
    storing a sports event as a video program in a storage device;
    playing the video program in a first area of a display, the video program configured to be played in a time-shifted manner;
    establishing a second area of the display as a video segment display area;
    receiving from the user a dynamic, personalized selection of one or more sports statistics related to the sports event to be displayed during playback of the video program in a pre-selected sequence; and
    presenting the specified one or more selected sports statistics to the user based on the sports event, the specified one or more selected sports statistics displayed in the video segment area of the display.

7. The method of claim 6, wherein the first area and the second area of the display are non-overlapping.

8. The method of claim 6, the method further comprising:
    allowing the user to specify a rotating sequence of the specified one or more sports statistics related to the sports event to be displayed during playback of the video program.

9. The method of claim 8, the method further comprising:
    allowing the user to specify one or more time intervals of the video program;
    automatically pausing the video program at the end of the one or more time intervals; and
    displaying a next sports statistic of the rotating sequence of the specified one or more sports statistics related to the sports event.

10. The method of claim 8, the method further comprising:
    displaying a camera angle of the video program corresponding to a sports statistic of the specified one or more sports statistics related to the sports event.

11. The method of claim 6, wherein the specified one or more sports statistics related to the sports event comprise passing yards, rushing yards, quarterback ratings, and third down conversion ratios.

12. A method for displaying a chalk talk to a user based on a sports event, the method comprising;
    storing a sports event as a video program in a storage device, the video program comprising a plurality of segments;
    generating metadata identifying and describing each of the plurality of segments of the video program; wherein the metadata comprises a chalk talk diagram of the corresponding segment;
    playing the video program in a first area of a display, the video program configured to be played in a time-shifted manner with respect to the chalk talk diagram in the metadata;
    establishing a second area of the display as a video segment display area; and
    in response to playing a segment of the video program, presenting a chalk talk diagram corresponding to the segment based on the sports event, the chalk talk diagram displayed in the video segment display area of the display and dynamically animated to show the chalk talk diagram in motion as the play progresses, the chalk talk elements of which correspond to the content of the segment being played.

13. The method of claim 12, wherein the first area and the second area of the display are non-overlapping.

14. The method of claim 12, the method further comprising:
    accepting an input from the user via a pause button or a rewind button to review the chalk talk diagram.

15. The method of claim 12, wherein the chalk talk diagram is interactive.

16. The method of claim 15, the method further comprising:
    receiving from the user a selection of a player from the chalk talk diagram; and displaying information related to the selected player.

17. The method of claim 12, further comprising:
    in response to playing a segment of the video program, presenting an audio analysis of the chalk talk diagram corresponding to the segment.

18. The method of claim 12, wherein playing the video program comprises:
    playing a condensed version of the video program.

* * * * *